United States Patent
Yu et al.

(10) Patent No.: US 12,095,884 B2
(45) Date of Patent: Sep. 17, 2024

(54) ELECTRONIC TERMINAL DEVICE THAT PERFORMS SCHEDULE CONTROL FOR LIMITING THE USE OF THE INTERNET AND APPLICATIONS, AND THE OPERATING METHOD THEREOF

(71) Applicant: FRANKLIN TECHNOLOGY INC., Seoul (KR)

(72) Inventors: Changsoo Yu, Hwaseong-si (KR); Ok Chae Kim, Seoul (KR)

(73) Assignee: FRANKLIN TECHNOLOGY INC., Seoul (KR)

( * ) Notice: Subject to any disclaimer, the term of this patent is extended or adjusted under 35 U.S.C. 154(b) by 0 days.

(21) Appl. No.: 18/221,393

(22) Filed: Jul. 13, 2023

(65) Prior Publication Data

US 2024/0137426 A1    Apr. 25, 2024
US 2024/0236207 A9    Jul. 11, 2024

(30) Foreign Application Priority Data

Oct. 25, 2022    (KR) .................. 10-2022-0138416

(51) Int. Cl.
    *H04L 67/62*      (2022.01)
(52) U.S. Cl.
    CPC .................. *H04L 67/62* (2022.05)
(58) Field of Classification Search
    CPC .......... H04L 63/10; H04L 67/62; G06F 21/62
    See application file for complete search history.

(56) References Cited

U.S. PATENT DOCUMENTS

2016/0315911 A1*   10/2016   Gupta .................... H04L 63/10
2017/0026382 A1*   1/2017    Trigger ............... H04L 63/0227
2022/0321417 A1*   10/2022   Martini ................... H04L 67/10

FOREIGN PATENT DOCUMENTS

| KR | 10-0483558 B1 | 4/2005 |
|---|---|---|
| KR | 10-0780393 B1 | 11/2007 |
| KR | 10-0813203 B1 | 3/2008 |
| KR | 10-1511474 B1 | 4/2015 |
| KR | 10-2016-0004600 A | 1/2016 |
| KR | 10-1874395 B1 | 7/2018 |
| KR | 10-2421572 B1 | 7/2022 |

* cited by examiner

*Primary Examiner* — Soe Hlaing
(74) *Attorney, Agent, or Firm* — Park, Kim & Suh, LLC

(57) ABSTRACT

Disclosed are an electronic terminal device and the operating method thereof which limit the use of the Internet and applications of the electronic terminal device based on a predetermined first scheduling rule for limiting the use of the Internet and applications set in the electronic terminal device, but when the electronic terminal device accesses a router device in which a predetermined second scheduling rule is set, provide a technique for limiting Internet use through the router device to prevent a user of the electronic terminal device from using the Internet and applications indiscriminately.

11 Claims, 2 Drawing Sheets

ELECTRONIC TERMINAL DEVICE THAT PERFORMS SCHEDULE CONTROL FOR LIMITING THE USE OF THE INTERNET AND APPLICATIONS, AND THE OPERATING METHOD THEREOF

CROSS-REFERENCE TO RELATED APPLICATIONS

This application claims priority to and the benefit of Korean Patent Application No. 10-2022-0138416 filed in the Korean Intellectual Property Office on Oct. 25, 2022, the entire contents of which are incorporated herein by reference.

TECHNICAL FIELD

The present disclosure relates to an electronic terminal device that performs schedule control for limiting the use of the Internet and applications and the operating method thereof.

BACKGROUND ART

Recently, as various Internet-capable electronic terminal devices such as desktop PCs, smart phones, and tablet PCs are spread, the use of the Internet using these electronic terminal devices is increasing.

On the Internet, there are many webpages that deliver beneficial information to users, but there are also many webpages that contain harmful information, so it is necessary for guardians to appropriately control Internet use through methods such as blocking access to webpages containing harmful contents or limiting Internet usage time for users who are still lacking in self-control, such as children and adolescents.

Since applications that can be installed on electronic terminal devices contain inappropriate content are being released, and there are many addictive applications such as games, the use of applications containing inappropriate content is restricted, and at the same time, it is also necessary to limit the use time so that the application is driven in the electronic terminal device only within the permitted time.

Companies and institutions often use the Internet for work, and in that there are many cases in which employees access webpages containing content unrelated to work during work hours, in order to increase work efficiency, it is necessary to properly control Internet use.

In this regard, by setting a predetermined setting for limiting the use of the Internet and applications on the electronic terminal device, it will be possible to prevent users of the electronic terminal device from indiscriminately using the Internet or applications. In addition, since various router equipments that support electronic terminal devices to access the Internet through Wi-Fi have recently been released, introduction of a technique may be considered, which limits the use of the Internet of the electronic terminal device through the router device when the electronic terminal device accesses the router device by making a predetermined setting for limiting Internet use on the router equipments.

SUMMARY OF THE INVENTION

The present disclosure has been made in an effort to provide an electric terminal device and the operating method thereof which limit the use of the Internet and applications of the electronic terminal device based on a predetermined first scheduling rule for limiting the use of the Internet and applications set in the electronic terminal device, but when the electronic terminal device accesses a router device in which a predetermined second scheduling rule is set, provides a technique for limiting Internet use through the router device to prevent a user of the electronic terminal device from using the Internet and applications indiscriminately.

An exemplary embodiment of the present disclosure provides an electronic terminal device that performs schedule control for limiting the use of the internet and applications, which includes: a schedule information storage unit storing a first scheduling rule (the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device, and identification information on a plurality of blocking target applications pre-specified to be prevented from being used in the electronic terminal device) predetermined by the administrator; an identification information storage unit storing unique identification information of a predetermined router equipment (the router equipment is an equipment which is set to limit, when the electronic terminal device accesses the router equipment, the use of the Internet of the electronic terminal device according to the second scheduling rule predetermined by the administrator, and in this case, the second scheduling rule is a rule constituted by a second filtering rule for identifying a webpage subject to access blocking and a predetermined second Internet blocking time for limiting the use of the Internet); a monitoring unit confirming a communication connection state of the electronic terminal device to monitor whether the electronic terminal device accesses the router equipment having the unique identification information; and a control unit performing, when it is confirmed that the electronic terminal device does not access the router equipment having the unique identification information, schedule control for limiting the use of the Internet and applications of the electronic terminal device according to the first scheduling rule, and stopping, when it is confirmed that the electronic terminal device accesses the router equipment having the unique identification information, the schedule control to process the electronic terminal device to be influenced by the use limitation of the Internet according to the second scheduling rule performed by the router equipment.

Another exemplary embodiment of the present disclosure provides an operating method of an electronic terminal device that performs schedule control for limiting the use of the internet and applications, which includes: maintaining a schedule information storage unit storing a first scheduling rule (the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device, and identification information on a plurality of blocking target applications pre-specified to be prevented from being used in the electronic terminal device) predetermined by the administrator; maintaining an identification information storage unit storing unique identification information of a predetermined router equipment (the router equipment is an equipment which is set to limit, when the electronic terminal device accesses the router equipment, the use of the Internet of the electronic terminal device according to the second scheduling rule predetermined by the administrator, and in this case, the second scheduling rule is a rule constituted by a second filtering rule for identifying a webpage subject to access blocking and a predetermined second Internet blocking time for limiting the use of the Internet); confirming a communication connection state of the electronic terminal device to monitor whether the electronic terminal device accesses the router equipment having the unique identification information; and performing, when it is confirmed that the electronic terminal device does not access the router equipment having the unique identification information, schedule control for limiting the use of the Internet and applications of the electronic terminal device according to the first scheduling rule, and stopping, when it is confirmed that the electronic terminal device accesses the router equipment having the unique identification information, the schedule control to process the electronic terminal device to be influenced by the use limitation of the Internet according to the second scheduling rule performed by the router equipment.

According to exemplary embodiments of the present disclosure, an electric terminal device and the operating method thereof limit the use of the Internet and applications of the electronic terminal device based on a predetermined first scheduling rule for limiting the use of the Internet and applications set in the electronic terminal device, but when the electronic terminal device accesses a router equipment in which a predetermined second scheduling rule is set, provides a technique for limiting Internet use through the router device to prevent a user of the electronic terminal device from using the Internet and applications indiscriminately.

DETAILED DESCRIPTION

Hereinafter, exemplary embodiments of the present disclosure will be described in detail with reference to the accompanying drawings. The description does not limit the present disclosure to specific exemplary embodiments, and it should be understood that the present disclosure covers all the modifications, equivalents and replacements included within the idea and technical scope of the present disclosure. In describing each drawing, like reference numerals refer to like elements and if not contrarily defined, all terms used herein including technological or scientific terms have the same meanings as those generally understood by a person with ordinary skill in the art.

In the present disclosure, unless explicitly described to the contrary, the word "comprise" and variations such as "comprises" or "comprising", will be understood to imply the inclusion of stated elements but not the exclusion of any other elements. Further, in various exemplary embodiments of the present disclosure, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processible equipment such as a universal computer, a special computer, a portable notebook computer, a network computer, etc., and performing specified functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
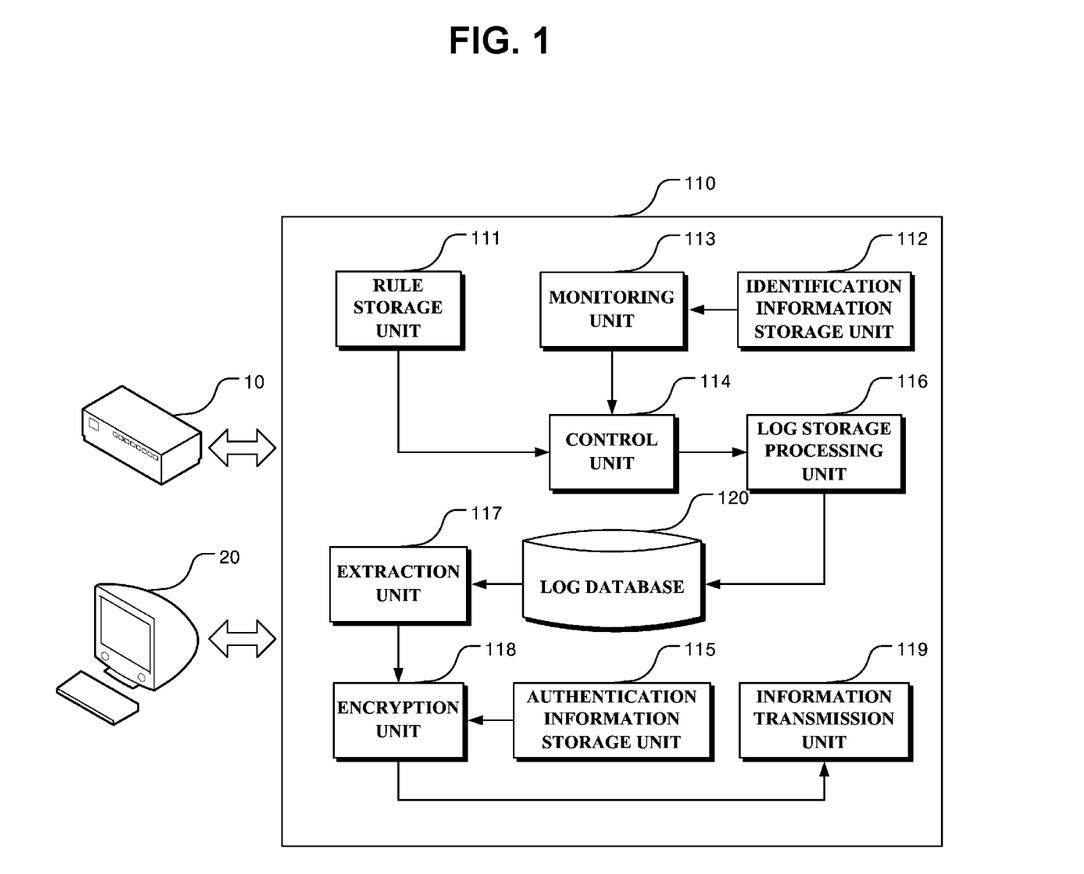
FIG. 1 is a diagram illustrating a structure of an electronic terminal device that performs schedule control for limiting the use of the Internet and applications according to an exemplary embodiment of the present disclosure.

FIG. 1 is a diagram illustrating a structure of an electronic terminal device that performs schedule control for limiting the use of the Internet and applications according to an exemplary embodiment of the present disclosure.

Referring to FIG. 1, the electronic terminal device 110 includes a rule storage unit 111, an identification information storage unit 112, a monitoring unit 113, and a control unit 114.

The rule storage unit 111 stores a first scheduling rule predetermined by an administrator.

Here, the first scheduling rule includes a rule constituted by a first filtering rule for identifying a webpage subject to access blocking, a predetermined first Internet blocking time for limiting Internet use, a predetermined first application driving blocking time for limiting the use of applications installed in the electronic terminal device 110, and identification information on a plurality of blocking target applications pre-specified to be prevented from being used in the electronic terminal device 110.

The first filtering rule as a rule configured based on a plurality of first blocking keywords set by the administrator means a rule specified to block the access of the electronic terminal device 110 to a first webpage if it is judged that there is at least one word in which a word similarity (the word similarity as a similarity calculated based on an embedding vector for each word generated by performing word embedding based on a semantic similarity mutually predetermined between words means a vector similarity between embedding vectors specified in respective words) with the plurality of first blocking keywords within the domain name of the first webpage and the text body of the first webpage is equal to or more than a predetermined reference value when the electronic terminal device 110 attempts to access the first webpage.

In this regard, the first scheduling rule may be a rule constituted by a first filtering rule constituted by a plurality of first blocking keywords shown in Table 1 below, a first Internet blocking time shown in Table 2 below, a first application driving blocking time shown in Table 3 below, and identification information of a plurality of blocking target applications shown in Table 4 below.

TABLE 1

| Plurality of first blocking keywords |
|---|
| Gambling |
| Coin |
| Bizarre |
| . . . |

TABLE 2

| First Internet blocking time |
|---|
| 0 to 6 |
| 12 to 13 |
| 18 to 20 |
| . . . |

TABLE 3

| First application driving blocking time |
|---|
| 0 to 8 |
| 15 to 20 |
| . . . |

TABLE 4

| Identification information of plurality of blocking target applications |
|---|
| Identification information 1 |
| Identification information 2 |
| . . . |

Here, the identification information of the application means unique information for identifying the application, such as a name of the corresponding application, a driving file name, and the like.

As such, when it is assumed that the plurality of first blocking keywords is set in as in Table 1 above, the first Internet blocking time is set as in Table 2 above, the first application driving blocking time is set as in Table 3 above, and the identification information of the plurality blocking target applications is set as in Table 4 above, the first scheduling rule may be a rule to specify, when it is judged that there is at least one word in which the word similarity with 'gambling, coin, and bizarre, . . . ' among a domain name of a webpage to be accessed by the electronic terminal device 110 and a text disclosed in a text body is equal to or more than the reference value, blocking the access to the webpage and at the same time, a rule to specify preventing the electronic terminal device 110 to access the Internet for the first Internet blocking time shown in Table 2, and a rule to specify preventing the application form being driven in the electronic terminal device 110 for the first application driving blocking time shown in Table 3, and a rule to specify preventing the application having identification information which is the same as the identification information of the plurality of blocking target applications shown in Table 4 from being driven in the electronic terminal device 110.

Here, in order to store the first scheduling rule in the rule storage unit 111, the administrator may use a scheme of directly setting the first scheduling rule in the electronic terminal device 110, or a scheme of transmitting the first scheduling rule to the electronic terminal device 110 through a management terminal 20 possessed thereby.

The identification information storage unit 112 stores unique identification information of a pre-specified router equipment 10.

Here, the router equipment 10 is a device that supports the electronic terminal device 110 to access the Internet environment through Wi-Fi, etc., and the electronic terminal device 110 of the present disclosure is equipped with a mobile communication module to access the Internet through a mobile communication network, but also equipped with a modem capable of accessing the router equipment 10 to access the Internet through accessing to the router equipment 10. Further, the unique identification information of the router equipment 10, as unique information for identifying the router equipment 10, may be a Media Access Control (MAC) address, a Service Set Identifier (SSID), or the like.

In this case, the router equipment 10 may be an equipment which is set to limit, when the electronic terminal device 110 accesses the router equipment 10, the use of the Internet of the electronic terminal device 110 according to the second scheduling rule predetermined by the administrator. Here, the second scheduling rule means a rule constituted by a second filtering rule for identifying a webpage subject to access blocking and a predetermined second Internet blocking time for limiting the use of the Internet.

In this case, the second filtering rule, as a rule configured based on a plurality of second blocking keywords set by the administrator, may be a rule specified to block the access of the electronic terminal device 110 to a second webpage when, if the electronic terminal device 110 attempts to access the second webpage, it is judged that there is at least one word in which a word similarity with the plurality of second blocking keywords within the domain name of the second webpage and the text body of the second webpage is equal to or more than the reference value.

In this regard, the second scheduling rule may be a rule constituted by a second filtering rule constituted by a plurality of second blocking keywords shown in Table 5 below and a second Internet blocking time shown in Table 6 below.

TABLE 5

| Plurality of second blocking keywords |
|---|
| Violence |
| Crime |
| Exploitation |
| . . . |

TABLE 6

| Second Internet blocking time |
|---|
| 0 to 9 |
| 13 to 14 |
| 18 to 22 |
| . . . |

As such, when it is assumed that the plurality of second blocking keywords is set as in Table 5 above and the second Internet blocking time is set as in Table 6 above, the second scheduling rule may be a rule to specify, when it is judged that there is at least one word in which the word similarity with the 'violence, crime, and exploitation, . . . ' among the domain name of the webpage to be accessed by the electronic terminal device 110 and a text disclosed on the text body is equal to or more than the reference value, blocking the access to the webpage, and at the same time, a rule to specify preventing the electronic terminal device 110 from accessing the Internet for the second Internet blocking time shown in Table 6 above.

The monitoring unit 113 confirms a communication connection state of the electronic terminal device 110 to monitor whether the electronic terminal device 110 accesses the router equipment 10 having the unique identification information.

When it is confirmed that the electronic terminal device 110 does not access the router equipment 10 having the unique identification information as a monitoring result of the monitoring unit 113, the control unit 114 performs schedule control for limiting the use of the Internet and applications of the electronic terminal device 110 according to the first scheduling rule, and when it is confirmed that the electronic terminal device 110 accesses the router equipment 10 having the unique identification information, the control unit 114 stops the schedule control to process the electronic terminal device 110 to be influenced by the use limitation of the Internet according to the second scheduling rule performed by the router equipment 10.

For example, if the router equipment 10 is an equipment that enables Wi-Fi wireless Internet, the monitoring unit 113 refers to the unique identification information of the router equipment 10 stored in the identification information storage unit 112 to monitor whether the electronic terminal device 110 currently accesses the router equipment 10.

If it is confirmed that the electronic terminal device 110 does not access the router equipment 10 but accesses the mobile communication network, the control unit 114 may perform the schedule control for limiting the use of the Internet and applications of the electronic terminal device 110 according to the first scheduling rule stored in the rule storage unit 111.

Specifically, if the electronic terminal device 110 does not access the router equipment 10 having the unique identification information, the control unit 114 may block the access of the electronic terminal device 110 to the webpage matching the first filtering rule, block the Internet access of the electronic terminal device 110 attempted for the first Internet blocking time based on the first scheduling rule, block application driving in the electronic terminal device 110 attempted for the first application driving blocking time, and block the driving of an application having identification information matching the identification information of the plurality of blocking applications in the electronic terminal device 110.

On the contrary, if it is confirmed that the Wi-Fi based wireless Internet is available through the router equipment 10 as the electronic terminal device 110 accesses the router equipment 10, the control unit 114 stops the schedule control performed according to the first scheduling rule to process the electronic terminal device 110 to be influenced by the use limitation of the Internet according to the second scheduling rule performed by the router equipment 10.

In this case, the router equipment 10 may perform control for limiting the use of the Internet according to the second scheduling rule for the electronic terminal device 110, and a specific operation of the router equipment 10 is as follows.

First, the router equipment 10 may previously store the second scheduling rule and the unique identification information of the electronic terminal device 110 in the equipment. Here, the unique identification information of the electronic terminal device 110, which means unique information for identifying the electronic terminal device 110, may become a Media Access Control (MAC) address, an International Mobile Equipment Identity (IMEI), an IP address, Token, UUID, etc.

In such a situation, when the electronic terminal device 110 accesses the router equipment 10, the router equipment 10 confirms the unique identification information of the electronic terminal device 110, and generates an event for instructing the electronic terminal device 110 to limit the use of the Internet according to the second scheduling rule, and then when the event is generated, blocks the access of the electronic terminal device 110 to the webpage matching the second filtering rule based on the second scheduling rule, and block the Internet access of the electronic terminal device 110 attempted for the second Internet blocking time.

That is, the electronic terminal device 110 according to the present disclosure may perform the schedule control for limiting the use of the Internet and applications according to whether the electronic terminal device 110 accesses the router equipment 10, and specifically, perform the schedule control for limiting the use of the Internet and applications of the electronic terminal device 110 according to the first scheduling rule which is an autonomous scheduling rule stored in the rule storage unit 111 when it is confirmed that the electronic terminal device 110 does not access the router equipment 10, and stop the schedule control for the electronic terminal device 110 to operate to be subjected to the Internet use limitation according to the second scheduling rule performed by the router equipment 10 when it is confirmed that the electronic terminal device 110 accesses the router equipment 10.

According to an exemplary embodiment of the present disclosure, the electronic terminal device 110 may further include an authentication information storage unit 115, a log storage processing unit 116, an extraction unit 117, an encryption unit 118, and an information transmission unit 119.

The authentication information storage unit 115 stores a preset authentication number with n (n is a natural number of 2 or more) digits and a predetermined hash function which is shared in advance with the management terminal 20 of the administrator.

The log storage processing unit 116 generates log information for the blocking event and stores the log information in the log database 120 whenever the blocking according to the first scheduling rule occurs through the control unit 114.

For example, when access blocking to 'webpage 1' occurs at 'Oct. 6, 2022, 13:20:23' as a result of performing the schedule control according to the first scheduling rule through the control unit 114, the log storage processing unit 116 may generates the log information for the blocking event as in 'webpage 1 access blocking at 13:20:23 on Oct. 6, 2022', and then store the log information in the log database 120.

As such, whenever the blocking event through the control unit 114 occurs, the log storage processing unit 116 may generate log information for the blocking event and store the log information in the log database 120.

In this situation, when the electronic terminal device 110 receives a request instruction to provide the log information stored in the log database 120 from the management terminal 20, the extraction unit 117 extracts the log information from the log database 120.

The encryption unit 118 randomly generates an n-digit serial number, and then generates a column vector having each digit of numbers constituting the serial number as a component and a row vector having each digit of numbers constituting the authentication number as a component, and computes a matrix multiplication between the column vector and the row vector to generate an n×n size computation matrix, and then randomly selects a first component which is one of the components constituting the computation matrix, and applies the first component to the hash function as an input to generate a first hash value, and encrypts the log information based on the first hash value.

For example, when it is assumed that n is '3', the authentication number stored in the authentication information storage unit 115 is '231', and the serial number is randomly generated as in '425', the encryption unit 118 generates $$\begin{bmatrix} 4 \\ 2 \\ 5 \end{bmatrix},$$

which is a column vector having the serial number '425' as the component, generates '[2 3 1]' which is a row vector having the authentication number '231' as the component, and then computes the matrix multiplication between the column vector and the row vector to generate a 3×3 size computation matrix as in $$\begin{bmatrix} 8 & 12 & 4 \\ 4 & 6 & 2 \\ 10 & 15 & 5 \end{bmatrix}.$$

Then, the encryption unit 118 randomly selects the first component which is any one of the components constituting the computation matrix as '15', and applies the first component '15' to the hash function stored in the authentication information storage unit 115 as the input to generate the first hash value, and then encrypt the log information based on the first hash value.

The information transmission unit 119 substitutes the first component with a randomly generated dummy component (the dummy component is generated as a different value from the first component) to generate a substitution matrix in the computation matrix, and encrypts each of the substitution matrix and the serial number with a predetermined private key (a public key forming a key pair with the private key is stored in the management terminal 20), and then transmits the encrypted substitution matrix and the encrypted serial number to the management terminal 20, and at the same time, transmits the encrypted log information to the management terminal 20.

In this regard, as in the above example, when the computation matrix is generated as in $$\begin{bmatrix} 8 & 12 & 4 \\ 4 & 6 & 2 \\ 10 & 15 & 5 \end{bmatrix},$$

and the first component is '15', the information transmission unit 119 may substitute the component '15' with the random dummy component '27' in the computation matrix to generate the substitution matrix $$\begin{bmatrix} 8 & 12 & 4 \\ 4 & 6 & 2 \\ 10 & 27 & 5 \end{bmatrix},$$

and encrypt each of the substitution matrix and the serial number with the private key, and then transmit the encrypted substitution matrix and the encrypted serial number to the management terminal 20, and at the same time, transmit the encrypted log information to the management terminal 20.

In this case, according to an exemplary embodiment of the present disclosure, the management terminal 20 may store, in advance, the public key, the authentication number, and the hash function in the memory, decrypts, when receiving, from the electronic terminal device 110, the encrypted substitution matrix, the encrypted serial number, and the encrypted log information, each of the substitution matrix encrypted and the serial number encrypted based on the public key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the encrypted log information based on the first hash value.

In this regard, as in the above example, if the authentication number and the serial number are '231' and '425', respectively, and the computation matrix and the substitution matrix are $$\begin{bmatrix} 8 & 12 & 4 \\ 4 & 6 & 2 \\ 10 & 15 & 5 \end{bmatrix},$$

and $$\begin{bmatrix} 8 & 12 & 4 \\ 4 & 6 & 2 \\ 10 & 27 & 5 \end{bmatrix},$$

respectively, when the management terminal 20 receives the encrypted substitution matrix, the encrypted serial number, and the encrypted log information from the electronic terminal device 110, the management terminal 20 may decrypt each of the encrypted substitution matrix and the encrypted serial number based on the public key, and then generate the column vector having each digit number constituting the decrypted serial number '425 as the component as $$\begin{bmatrix} 4 \\ 2 \\ 5 \end{bmatrix},$$

and generate the row vector having each digit number constituting '231' which is the authentication number stored in the memory as the component as '[2 3 1]'.

Then, the management terminal 20 computes the matrix multiplication between the column vector and the row vector to generate the computation matrix having the 3×3 size as in $$\cdot \begin{bmatrix} 8 & 12 & 4 \\ 4 & 6 & 2 \\ 10 & 15 & 5 \end{bmatrix}.$$

Thereafter, the management terminal 20 compares the computation matrix $$\cdot \begin{bmatrix} 8 & 12 & 4 \\ 4 & 6 & 2 \\ 10 & 15 & 5 \end{bmatrix},$$

and the decrypted substitution matrix $$\cdot \begin{bmatrix} 8 & 12 & 4 \\ 4 & 6 & 2 \\ 10 & 27 & 5 \end{bmatrix},$$

with each other to extract '15' which is the component in the computation matrix, which does not match the substitution matrix as the first component, and when the first component '15' is extracted, the management terminal 20 applies the first component '15' to the hash function stored in the memory as the input to calculate the first hash value, and then decrypt the encrypted log information based on the first hash value.

Through this, the administrator confirms the log information through the management terminal 20 to confirm a blocking history for the Internet and applications, which occurs in the electronic terminal device 110.

Figure 2:
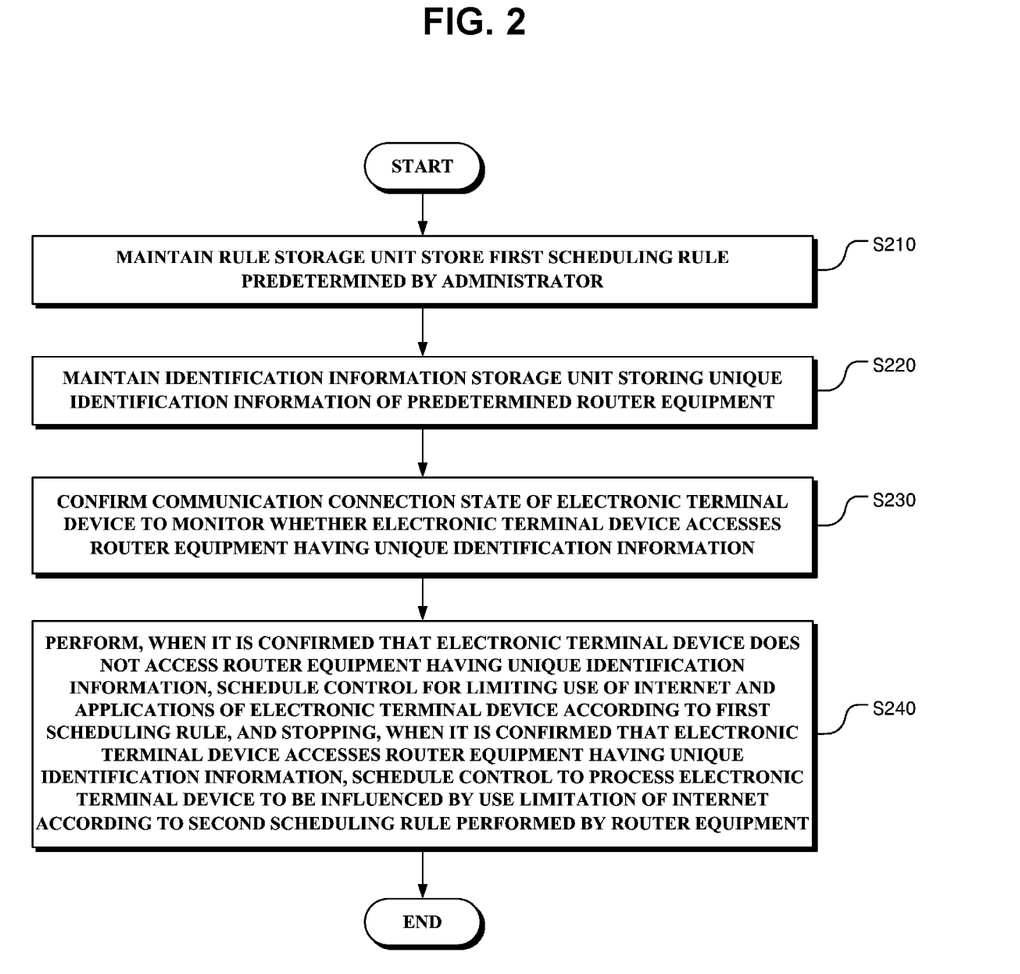
FIG. 2 is a flowchart illustrating the operating method of the electronic terminal device that performs schedule control for limiting the use of the Internet and applications according to an exemplary embodiment of the present disclosure.

FIG. 2 is a flowchart illustrating the operating method of the electronic terminal device that performs schedule control for limiting the use of the Internet and applications according to an exemplary embodiment of the present disclosure.

In step S210, a rule storage unit is maintained, which stores a first scheduling rule (the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device 110, and identification information on a plurality of blocking target applications pre-specified to be prevented from being used in the electronic terminal device) predetermined by the administrator.

In step S220, an identification information storage unit is maintained, which stores unique identification information of a predetermined router equipment (the router equipment is an equipment which is set to limit, when the electronic terminal device accesses the router equipment, the use of the Internet of the electronic terminal device according to the second scheduling rule predetermined by the administrator, and in this case, the second scheduling rule is a rule constituted by a second filtering rule for identifying a webpage subject to access blocking and a predetermined second Internet blocking time for limiting the use of the Internet).

In step S230, a communication connection state of the electronic terminal device is confirmed to monitor whether the electronic terminal device accesses the router equipment having the unique identification information.

In step S240, when it is confirmed that the electronic terminal device does not access the router equipment having the unique identification information, the control unit performs schedule control for limiting the use of the Internet and applications of the electronic terminal device according to the first scheduling rule, and when it is confirmed that the electronic terminal device accesses the router equipment having the unique identification information, the control unit stops the schedule control to process the electronic terminal device to be influenced by the use limitation of the Internet according to the second scheduling rule performed by the router equipment.

In this case, according to an exemplary embodiment of the present disclosure, the first filtering rule as a rule configured based on a plurality of first blocking keywords set by the administrator may be a rule specified to block the access of the electronic terminal device to a first web page when, if the electronic terminal device attempts to access the first web page, it is judged that there is at least one word in which a word similarity (the word similarity as a similarity calculated based on an embedding vector for each word generated by performing word embedding based on a semantic similarity mutually predetermined between words means a vector similarity between embedding vectors designated in respective words) with the plurality of first blocking keywords within the domain name of the first webpage and the text body of the first webpage is equal to or more than a predetermined reference value.

The second filtering rule, as a rule configured based on a plurality of second blocking keywords set by the administrator, may be a rule specified to block the access of the electronic terminal device to a second webpage when, if the electronic terminal device attempts to access the second webpage, it is judged that there is at least one word in which a word similarity with the plurality of second blocking keywords within the domain name of the second webpage and the text body of the second webpage is equal to or more than the reference value.

According to an exemplary embodiment of the present disclosure, in step S240, if it is confirmed that the electronic terminal device does not access the router equipment having the unique identification information, the control unit may block the access of the electronic terminal device to the webpage matching the first filtering rule, block the Internet access of the electronic terminal device attempted for the first Internet blocking time, block application driving in the electronic terminal device attempted for the first application driving blocking time based on the first scheduling rule, and block the driving of an application having identification information matching the identification information of the plurality of blocking applications in the electronic terminal device.

According to an exemplary embodiment of the present disclosure, the router equipment may previously store the second scheduling rule and the unique identification information of the electronic terminal device in the equipment, and when the electronic terminal device accesses the router equipment, the router equipment confirms the unique identification information of the electronic terminal device, and generates an event for instructing the electronic terminal device to limit the use of the Internet according to the second scheduling rule, and then when the event is generated, blocks the access of the electronic terminal device to the webpage matching the second filtering rule based on the second scheduling rule, and block the Internet access of the electronic terminal device attempted for the second Internet blocking time.

According to an exemplary embodiment of the present disclosure, an operating method of the electronic terminal device may further include a step of maintaining an authentication information storage unit storing a preset authentication number with n (n is a natural number of 2 or more) digits and a predetermined hash function which is shared in advance with the management terminal of the administrator, a step of generating log information for the blocking event and storing the log information in the log database whenever the blocking according to the first scheduling rule occurs through step S240, a step of extracting, when a providing request instruction of the log information stored in the log database is received from the management terminal, the log information from the log database, a step of randomly generating an n-digit serial number, and then generating a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the log information based on the first hash value, and, a step of substituting the first component with a randomly generated dummy component (the dummy component is generated as a different value from the first component) to generate a substitution matrix in the computation matrix, and encrypting each of the substitution matrix and the serial number with a predetermined private key (a public key forming a key pair with the private key is stored in the management terminal), and then transmitting the encrypted substitution matrix and the encrypted serial number to the management terminal, and at the same time, transmitting the encrypted log information to the management terminal.

In this case, the management terminal store, in advance, the public key, the authentication number, and the hash function in the memory, decrypts, when receiving, from the electronic terminal device, the encrypted substitution matrix, the encrypted serial number, and the encrypted log information, each of the substitution matrix encrypted and the serial number encrypted based on the public key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the encrypted log information based on the first hash value.

Hereinabove, referring to FIG. 2, the operating method of the electronic terminal device according to an exemplary embodiment of the present disclosure is described. Here, since the operating method of the electronic terminal device according to an exemplary embodiment of the present disclosure may correspond to the configuration of the operation of the electronic terminal device 110 described by using FIG. 1, a more detailed description thereof will be omitted.

The operating method of the electronic terminal device according to an exemplary embodiment of the present disclosure may be implemented by a computer program stored in a storage medium for executing the computer program through coupling with a computer.

The operating method of the electronic terminal device according to an exemplary embodiment of the present disclosure may be implemented in a program command type which may be performed through various computer means and recorded in a computer readable medium. The computer readable medium may include a program command, a data file, a data structure, etc., singly or combinationally. The program command recorded in the medium may be specially designed and configured for the present disclosure, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present disclosure has been described by specified matters such as detailed components, and the like and limited exemplary embodiments and drawings, but the description is just provided to assist more overall understanding of the present disclosure and the present disclosure is not limited to the exemplary embodiment and various modifications and changes can be made by those skilled in the art from such a disclosure.

Accordingly, the spirit of the present disclosure should not be defined only by the described exemplary embodiments, and it should be appreciated that claims to be described below and all which are equivalent to the claims or equivalently modified are included in the scope of the present disclosure.

What is claimed is:

1. An electronic terminal device that performs schedule control for limiting the use of the internet and applications, comprising:

a rule storage unit storing a first scheduling rule, wherein the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device, and identification information on a plurality of blocking target applications pre-specified to be prevented from being used in the electronic terminal device, predetermined by the administrator;

an identification information storage unit storing unique identification information of a predetermined router equipment, wherein the router equipment is an equipment which is set to limit, when the electronic terminal device accesses the router equipment, the use of the Internet of the electronic terminal device according to a second scheduling rule predetermined by the administrator, and in this case, the second scheduling rule is a rule constituted by a second filtering rule for identifying a webpage subject to access blocking and a predetermined second Internet blocking time for limiting the use of the Internet;

a monitoring unit confirming a communication connection state of the electronic terminal device to monitor whether the electronic terminal device accesses the router equipment having the unique identification information; and a control unit performing, when it is confirmed that the electronic terminal device does not access the router equipment having the unique identification information, schedule control for limiting the use of the Internet and applications of the electronic terminal device according to the first scheduling rule, and stopping, when it is confirmed that the electronic terminal device accesses the router equipment having the unique identification information, the schedule control to process the electronic terminal device to be influenced by the use limitation of the Internet according to the second scheduling rule performed by the router equipment.

2. The electronic terminal device of claim 1, wherein the first filtering rule as a rule configured based on a plurality of first blocking keywords set by the administrator is a rule specified to block the access of the electronic terminal device to a first web page when, if the electronic terminal device attempts to access the first web page, it is judged that there is at least one word in which a word similarity, wherein the word similarity as a similarity calculated based on an embedding vector for each word generated by performing word embedding based on a semantic similarity mutually predetermined between words means a vector similarity between embedding vectors designated in respective words, with the plurality of first blocking keywords within the domain name of the first webpage and the text body of the first webpage is equal to or more than a predetermined reference value, and the second filtering rule, as a rule configured based on a plurality of second blocking keywords set by the administrator, is rule specified to block the access of the electronic terminal device to a second webpage when, if the electronic terminal device attempts to access the second webpage, it is judged that there is at least one word in which a word similarity with the plurality of second blocking keywords within the domain name of the second webpage and the text body of the second webpage is equal to or more than the reference value.

3. The electronic terminal device of claim 2, wherein if the electronic terminal device does not access the router equipment having the unique identification information, the control unit blocks the access of the electronic terminal device to the webpage matching the first filtering rule, blocks the Internet access of the electronic terminal device attempted for the first Internet blocking time, blocks application driving in the electronic terminal device attempted for the first application driving blocking time, and blocks the driving of an application having identification information matching the identification information of the plurality of blocking applications in the electronic terminal device based on the first scheduling rule.

4. The electronic terminal device of claim 2, wherein the router equipment previously stores the second scheduling rule and the unique identification information of the electronic terminal device in the equipment, and when the electronic terminal device accesses the router equipment, the router equipment confirms the unique identification information of the electronic terminal device, and generates an event for instructing the electronic terminal device to limit the use of the Internet according to the second scheduling rule, and then when the event is generated, blocks the access of the electronic terminal device to the webpage matching the second filtering rule, and blocks the Internet access of the electronic terminal device attempted for the second Internet blocking time based on the second scheduling rule.

5. The electronic terminal device of claim 1, further comprising:

an authentication information storage unit storing a preset authentication number with n, wherein n is a natural number of 2 or more, digits and a predetermined hash function which is shared in advance with a management terminal of the administrator;

a log storage processing unit generating log information for the blocking event and storing the log information in the log database whenever the blocking according to the first scheduling rule occurs through the control unit;

an extraction unit extracting, when a providing request instruction of log information stored in the log database is received from the management terminal, the log information from the log database;

an encryption unit randomly generating an n-digit serial number, and then generates a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the log information based on the first hash value; and an information transmission unit substituting the first component with a randomly generated dummy component, wherein the dummy component is generated as a different value from the first component, to generate a substitution matrix in the computation matrix, and encrypting each of the substitution matrix and the serial number with a predetermined private key, wherein a public key forming a key pair with the private key is stored in the management terminal, and then transmitting the encrypted substitution matrix and the encrypted serial number to the management terminal, and at the same time, transmitting the encrypted log information to the management terminal, wherein the management terminal store, in advance, the public key, the authentication number, and the hash function in the memory, decrypts, when receiving, from the electronic terminal device, the encrypted substitution matrix, the encrypted serial number, and the encrypted log information, each of the substitution matrix and the serial number based on the public key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the encrypted log information based on the first hash value.

6. An operating method of an electronic terminal device that performs schedule control for limiting the use of the internet and applications, comprising:

maintaining a rule storage unit storing a first scheduling rule, wherein the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device, and identification information on a plurality of blocking target applications pre-specified to be prevented from being used in the electronic terminal device, predetermined by the administrator;

maintaining an identification information storage unit storing unique identification information of a predetermined router equipment, wherein the router equipment is an equipment which is set to limit, when the electronic terminal device accesses the router equipment, the use of the Internet of the electronic terminal device according to a second scheduling rule predetermined by the administrator, and in this case, the second scheduling rule is a rule constituted by a second filtering rule for identifying a webpage subject to access blocking and a predetermined second Internet blocking time for limiting the use of the Internet;

confirming a communication connection state of the electronic terminal device to monitor whether the electronic terminal device accesses the router equipment having the unique identification information; and performing, when it is confirmed that the electronic terminal device does not access the router equipment having the unique identification information, schedule control for limiting the use of the Internet and applications of the electronic terminal device according to the first scheduling rule, and stopping, when it is confirmed that the electronic terminal device accesses the router equipment having the unique identification information, the schedule control to process the electronic terminal device to be influenced by the use limitation of the Internet according to the second scheduling rule performed by the router equipment.

7. The operating method of an electronic terminal device of claim 6, wherein the first filtering rule as a rule configured based on a plurality of first blocking keywords set by the administrator means a rule designated to block the access of the electronic terminal device to a first web page when, if the electronic terminal device attempts to access the first web page, it is judged that there is at least one word in which a word similarity, wherein the word similarity as a similarity calculated based on an embedding vector for each word generated by performing word embedding based on a semantic similarity mutually predetermined between words means a vector similarity between embedding vectors designated in respective words, with the plurality of first blocking keywords within the domain name of the first webpage and the text body of the first webpage is equal to or more than a predetermined reference value, and the second filtering rule, as a rule configured based on a plurality of second blocking keywords set by the administrator, is rule specified to block the access of the electronic terminal device to a second webpage when, if the electronic terminal device attempts to access the second webpage, it is judged that there is at least one word in which a word similarity with the plurality of second blocking keywords within the domain name of the second webpage and the text body of the second webpage is equal to or more than the reference value.

8. The operating method of an electronic terminal device of claim 7, wherein in the processing, if the electronic terminal device does not access the router equipment having the unique identification information, the access of the electronic terminal device to the webpage matching the first filtering rule is blocked, the Internet access of the electronic terminal device attempted is blocked for the first Internet blocking time, application driving in the electronic terminal device attempted for the first application driving blocking time is blocked, and the driving of an application having identification information matching the identification information of the plurality of blocking applications is blocked in the electronic terminal device based on the first scheduling rule.

9. The operating method of an electronic terminal device of claim 7, wherein the router equipment previously stores the second scheduling rule and the unique identification information of the electronic terminal device in the equipment, and when the electronic terminal device accesses the router equipment, the router equipment confirms the unique identification information of the electronic terminal device, and generates an event for instructing the electronic terminal device to limit the use of the Internet according to the second scheduling rule, and then when the event is generated, blocks the access of the electronic terminal device to the webpage matching the second filtering rule, and blocks the Internet access of the electronic terminal device attempted for the second Internet blocking time based on the second scheduling rule.

10. The operating method of an electronic terminal device of claim 6, further comprising:

maintaining an authentication information storage unit storing a preset authentication number with n, wherein n is a natural number of 2 or more, digits and a predetermined hash function which is shared in advance with a management terminal of the administrator;

generating log information for the blocking event and storing the log information in the log database whenever the blocking according to the first scheduling rule occurs through the processing;

extracting, when a providing request instruction of log information stored in the log database is received from the management terminal, the log information from the log database;

randomly generating an n-digit serial number, and then generates a column vector having each digit of numbers constituting the serial number as a component and a row vector having each digit of numbers constituting the authentication number as a component, and computing a matrix multiplication between the column vector and the row vector to generate an n×n size computation matrix, and then randomly selecting a first component which is one of the components constituting the computation matrix, and applying the first component to the hash function as an input to generate a first hash value, and encrypting the log information based on the first hash value; and substituting the first component with a randomly generated dummy component, wherein the dummy component is generated as a different value from the first component, to generate a substitution matrix in the computation matrix, and encrypting each of the substitution matrix and the serial number with a predetermined private key, wherein a public key forming a key pair with the private key is stored in the management terminal, and then transmitting the encrypted substitution matrix and the encrypted serial number to the management terminal, and at the same time, transmitting the encrypted log information to the management terminal, wherein the management terminal store, in advance, the public key, the authentication number, and the hash function in the memory, decrypts, when receiving, from the electronic terminal device, the encrypted substitution matrix, the encrypted serial number, and the encrypted log information, each of the substitution matrix and the serial number based on the public key, and then generate a column vector having respective digits of numbers constituting the decrypted serial number as the component and a row vector having respective digits of numbers constituting the authentication number stored in the memory as the component, and computes the matrix multiplication between the column vector and the row vectors to generate the computation matrix having an n×n size, and then compare the computation matrix and the decrypted substitution matrix, and extract a component in the computation matrix, which does not match the substitution matrix as the first component, and apply the first component to the hash function stored in the memory as the input to calculate the first hash value, and then decrypt the encrypted log information based on the first hash value.

11. A non-transitory computer readable recording medium having a program recorded therein for allowing a computer to execute an operating method of an electronic terminal device that performs schedule control for limiting the use of the internet and applications, comprising:

maintaining a rule storage unit storing a first scheduling rule, wherein the first scheduling rule is a rule constituted by a first filtering rule for identifying a webpage subject to access blocking, a predetermined first Internet blocking time for limiting Internet use, a predetermined first application driving blocking time for limiting the use of applications installed in the electronic terminal device, and identification information on a plurality of blocking target applications pre-specified to be prevented from being used in the electronic terminal device, predetermined by the administrator;

maintaining an identification information storage unit storing unique identification information of a predetermined router equipment, wherein the router equipment is an equipment which is set to limit, when the electronic terminal device accesses the router equipment, the use of the Internet of the electronic terminal device according to a second scheduling rule predetermined by the administrator, and in this case, the second scheduling rule is a rule constituted by a second filtering rule for identifying a webpage subject to access blocking and a predetermined second Internet blocking time for limiting the use of the Internet;

confirming a communication connection state of the electronic terminal device to monitor whether the electronic terminal device accesses the router equipment having the unique identification information; and performing, when it is confirmed that the electronic terminal device does not access the router equipment having the unique identification information, schedule control for limiting the use of the Internet and applications of the electronic terminal device according to the first scheduling rule, and stopping, when it is confirmed that the electronic terminal device accesses the router equipment having the unique identification information, the schedule control to process the electronic terminal device to be influenced by the use limitation of the Internet according to the second scheduling rule performed by the router equipment.

* * * * *